Sept. 2, 1958 D. G. GOULD 2,850,255
AUTOMATIC WEIGHING APPARATUS
Filed May 13, 1955 2 Sheets-Sheet 1
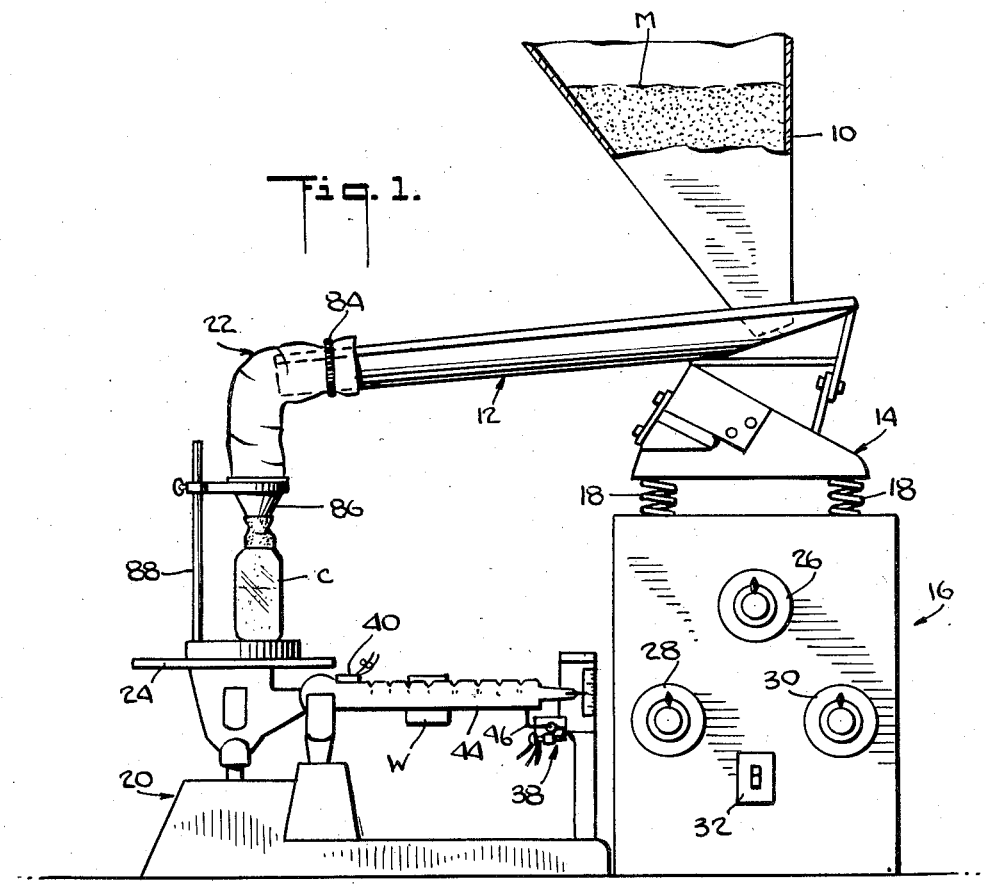
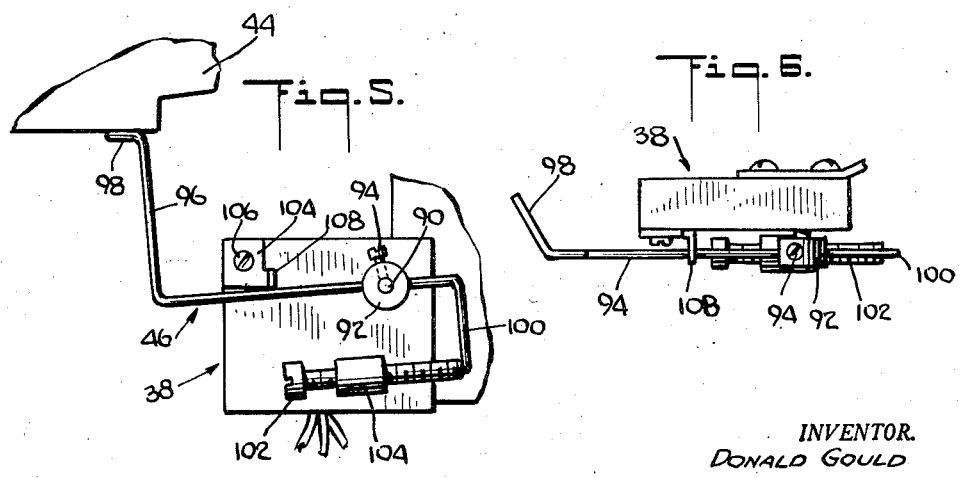
INVENTOR.
DONALD GOULD
BY
*J. B. Felshin*
ATTORNEY Sept. 2, 1958                    D. G. GOULD                    2,850,255
                          AUTOMATIC WEIGHING APPARATUS
Filed May 13, 1955                                         2 Sheets-Sheet 2
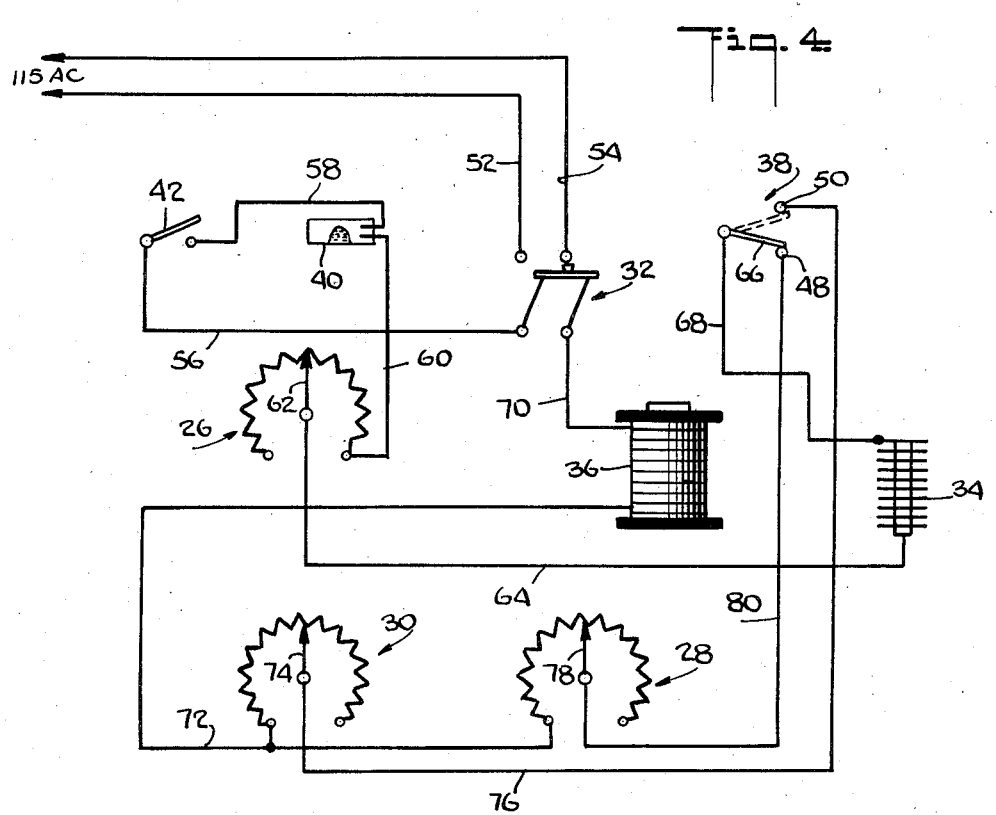
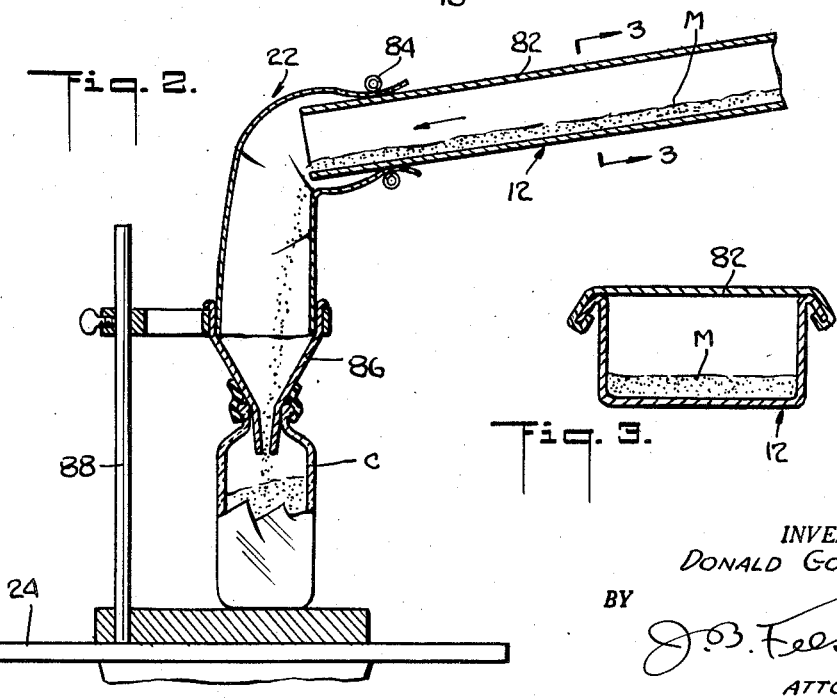
INVENTOR.
DONALD GOULD
BY
J. B. Felshin
ATTORNEY

United States Patent Office 2,850,255
Patented Sept. 2, 1958

2,850,255

AUTOMATIC WEIGHING APPARATUS

Donald G. Gould, New Milford, N. J.

Application May 13, 1955, Serial No. 508,089

6 Claims. (Cl. 249—2)

My invention relates to automatic weighing apparatus and is directed particularly to apparatus for rapidly and continuously filling bottles, cartons or other containers with predetermined amounts of dry bulk substances such as chemicals, granular materials, small parts and the like.

The principal object of my invention is to provide a device of the character described having two speeds of operation, a fast speed for filling the container nearly full, and a slow speed for completing the filling operation, the slow speed going into operation automatically upon completion of the fast fill operation, so that containers can be filled in the least possible amount of time consistent with high measuring accuracy.

Another object of the invention is to provide apparatus of the above nature which is controlled by a simple and fool-proof electrical circuit having master control means for adjusting the over-all speed of the filling operation, whereby the apparatus can readily be adjusted for use with materials of different particle size or consistency.

Another object of the invention is to provide a device of the above nature having a beam scale, a vibratory flow control circuit and a single-pole double-throw microswitch in the circuit and adapted to be controlled by the position of the scale beam for switching from high speed to slow speed operation.

A further object is to provide apparatus of the character described embodying adjustable mechanism in association with the microswitch for enhancing its sensitivity, thereby further increasing the accuracy of the filling operation.

Yet another object of this invention is to provide a rugged and durable device of the character described which shall be inexpensive to manufacture, easy to manipulate, attractive in appearance and practical and efficient to a high degree in use.

Other objects in part will be obvious from this disclosure taken in conjunction with the accompanying drawing and in part specifically pointed out hereinbelow.

In the drawings, wherein like reference numerals denote corresponding parts throughout the several views:

Fig. 1 illustrates an elevated view of the improved container filling and weighing apparatus embodying the invention;

Fig. 2 is an enlarged view partly in cross-section of a portion of the apparatus shown in Fig. 1;

Fig. 3 is a cross-sectional view of the material feed tray taken along the line 3—3 of Fig. 2;

Fig. 4 is a circuit diagram of the associated control circuit;

Fig. 5 is an elevational view of the circuit control microswitch, illustrating its cooperative association with the indicating end of the scale beam and the adjustable mechanism for controlling sensitivity; and Fig. 6 is a top view of the microswitch shown in Fig. 5.

In brief, the apparatus embodying the invention comprises a vibratory material feeder, a small hopper, a beam scale and a controllable circuit providing two rates of speed of the vibratory feeder. A microswitch in the control circuit is cooperative with the scale beam so as to be switched from high speed to low speed of operation of the vibratory feeder when the filling operation nears completion depending upon the pre-setting of the scale. When filling is completed, a mercury switch in the circuit and carried by the scale beam interrupts the circuit to stop the vibratory feeder and thus stop the filling operation.

Referring now in detail to the drawing, the improved weighing and filling apparatus comprises generally a material hopper 10 feeding into a tray or chute member 12 supported for vibration by a vibrating device 14, a control box 16 upon which the vibration device 14 is resiliently supported by springs 18, a movable beam scale 20, and a sleeve-funnel device 22 for directing the material M into a container C placed on the platform 24 of the scale during the filling operation. The control box 16 houses a master rheostat 26, a fast-fill rheostat 28, a slow-fill rheostat 30 and a double-pole single-throw main switch 32, all readily controllable by the operation from the front of the said control box as hereinbelow more fully described. Said rheostats and main switch comprise elements of the electrical control circuit (Fig. 5) of the device. The electrical circuit also comprises a dry rectifier unit 34, preferably housed within control box 16, a vibrator magnet 36 forming part of the vibration device 14, a single-pole double-throw snap action switch 38, a mercury switch 40 and a foot-operated control switch 42.

The mercury switch 40 is mounted upon the inner end of the movable scale beam 44 of the scale 20 and is adapted to become open-circuited when the beam moves upwardly into balance position for the purpose hereinbelow described. Snap action switch 38 is fixedly mounted with respect to the scale 20 and is cooperative with the outer end of the scale beam 44 through a lever mechanism generally indicated by the numeral 46 and more particularly described hereinbelow to be actuated to make the connection to the lower switch pole 48, as shown in full lines in Fig. 4, when the scale is more than a controllable slight amount off balance, and to make connection to the upper switch pole 50, as shown in dotted lines in Fig. 4, first before the scale reaches final balance.

The control circuit is energized from the usual 115 volt A. C. service line through a pair of lines 52, 54 connected to the fixed poles of the main switch 32. One of the movable contacts of said switch is connected in series with the foot switch 42, the mercury switch 40 and the master rheostat 26 by means of wires 56, 58 and 60, respectively. The movable contact 62 of rheostat 26 connects through a wire 64 to one terminal of the rectifier 34; and the other terminal of said rectifier is connected to the movable contact pole 66 of the snap action switch 38 through a wire 68.

The remaining movable switch contact of main switch 32 is connected through the vibrator magnet 36 to the fixed terminals of both the fast fill rheostat 28 and the slow fill rheostat 30 by wires 70 and 72. The movable contact 74 of slow fill rheostat 30 is connected by wire 76 to the upper switch pole 50 of the snap action switch 38; and the movable contact 78 of the fast fill rheostat 28 is connected by wire 80 to the lower switch pole 48 of said switch.

Considering now the operation of the control circuit, it will be apparent that when the main switch 32 and the foot switch 42 are close-circuited, and when the scale beam 44 is in downwardly-inclined position, as will be the case when an unfilled container is on the scale platform 24, a circuit will be established for energizing the magnet 36 with pulsating direct current. This energizing circuit can be traced from power line 52, through main switch 32, wire 56, closed foot switch 42, closed mercury switch 40, wire 60, through master rheostat 26, movable contact 62, wire 64, rectifier 34, wire 68, snap action switch 38, wire 80 through fast-fill rheostat 28 and wire 72 to one terminal of the vibrator magnet 36. The remaining terminal of the vibrator magnet is connected through wire 70 and the main switch 32 to the remaining power line 54. The series rectifier 34 serves to change the A. C. into a pulsating D. C. energizing current for the vibrator magnet 36, which magnet is located and connected in the vibration device 14 in a manner well known in the art to transmit the desired vibrations to the feeder tray member 12. The fast fill or low resistance rheostat 28 is of lesser total resistance than the slow fill or high resistance rheostat 30, so that stronger impulses will be applied to the vibrator magnet 36 though when the slow fill rheostat 30 is switched in upon the filling operation nearing completion.

When the filling operation nears completion, the snap action switch 38 as described above switches to the upper position as indicated in dotted lines in Fig. 4, to switch out the fast fill rheostat 28 and switch in the slow fill rheostat 30 through movable contact pole 66, wire 76 and movable contact 74 of said slow fill rheostat, the remainder of the circuit being the same as described above.

Thus, when the filling operation nears completion, the vibrating force of the vibrator magnet 36 will be diminished with the result that material will flow at a lesser rate into the container. When the container reaches its filled condition as determined by balance of the scale, the mercury switch 40 will open-circuit to discontinue the flow of energizing current to the vibrator magnet 36 and thus stop the filling operation. The amount of material that will be supplied to the container is of course a function of its weight, and the filled condition is predetermined by proper resetting of the scale balance beam counter-weight W.

In continuous use of the machine, upon the completion of one filling operation, the foot switch 42 will be released and the filled container replaced by an empty one. The foot switch will then be actuated and the filling operation will automatically proceed again as outlined above. It will be apparent that the master rheostat 26, which is always in the series circuit energizing the vibrator magnet 36, allows for setting the over-all speed of operation of the device according to the nature of the particular material M being fed. The fast and slow fill rheostats 28, 30 serve to adjust the difference in speed between the slow fill and fast fill operations, thus being fine adjustments both for speed and accuracy of filling.

In order to prevent the material M with which the containers are being filled from diffusing as dust in the surrounding air as is conveyed from the hopper 10 down the vibrating tray member 12 and into the container C, said tray member is provided with an interengaging enclosing cover 82. The sleeve funnel device 22, preferably of a strong, light-weight cloth such as nylon, is secured to the end of the vibrating tray 12 as by a spring band 84, and the other end of said sleeve is fitted with a light-weight funnel 86 extending into the mouth of the container C. The funnel 86 is supported by a standard 88 set upon the platform of the scale 20.

The lever mechanism 46 through which the microswitch 38 is actuated by the outer end of the scale beam 44 is fixed to the rotative shaft 90 of said switch through a collar 92 set by a set-screw 94 (see Figs. 5 and 6). One end of the lever extends upwardly as indicated by the numerals 96 and outwardly obliquely as indicated by 98. Said outwardly-extending end is contacted by the underside of the scale beam when the scale is in under-balanced condition. The other end of the lever extends downwardly as indicated by the numeral 100 and has fixed to its lower end one end of a screw member 102 extending inwardly and parallel with the horizontal portion of the lever mechanism 46. The screw member 102 has threaded thereon an adjustment nut 104 adjustably operative to add to the counterclockwise movement arm imposed upon the rotative shaft 90 of the microswitch 38, and thereby partially neutralize the inherent spring force of said microswitch to increase its sensitivity. A stop member 104 adjustably screwed to the microswitch as by a screw 106 has a lug portion 108 contacting the upper surface of the lever mechanism 46 to limit clockwise rotation thereof. The stop member can be adjusted to prevent overtravel of the lever mechanism 46 and thereby prevent its interference during the final balancing operation.

In view of the foregoing description it will be apparent that the automatic filling or packaging device herein described operates at high speed for bulk fill until the scale beam becomes poised in the critical area near balance, at which point slow speed or dribble flow of the material fills the container to the desired amount by weight with a high degree of accuracy.

While there has been disclosed in this specification only one form in which the invention may conveniently be embodied in practice, it is to be understood that this form is shown for the purposes of illustration only, and that the invention is not to be limited to the specific disclosure, but may be modified and embodied in various other forms without departing from its spirit. In short, the invention contains all the modifications and embodiments coming within the scope of the following claims.

I claim:

1. An automobile material feeding and container filling apparatus comprising a scale having a movable balance beam for weighing materials, a material hopper, a resiliently mounted material flow tray adapted to receive material from said hopper and convey it to said scale, means including an electromagnet for vibrating said tray and thereby convey the material to said scale, an electrical circuit for supplying pulsating energizing current to said magnet, a first current control means for controlling the magnitude of current supplied to said electromagnet, a second current control means for controlling the magnitude of current suplied to said electromagnet, means for connecting said first or second current control means selectively in said circuit, said selectively connecting means comprising a single-pole double-throw snap action switch adapted to be actuated by the end of said scale beam as it passes from an unbalance position to a position near balance, and a mercury switch in said circuit and operative to open said circuit when said balance beam reaches balanced position.

2. The invention as defined in claim 1, wherein said snap action switch is provided with a rotative control arm having one end cooperatively disposed with the end of said balance beam and the other end provided with a screw member and a nut threaded thereon for varying the moment arm of said control arm.

3. The invention as defined in claim 1, wherein said pulsating current supply means comprises a dry half-wave rectifier for rectifying A. C. current.

4. An automatic material feeding and container filling apparatus comprising a scale having a movable balance beam for weighing materials, a material hopper, a resiliently mounted material flow tray adapted to receive material from said hopper and convey it to said scale, means including an electromagnet for vibrating said tray and thereby convey the material to said scale, an electrical circuit for supplying pulsating energizing current to said magnet, a first current control means for controlling the magnitude of current supplied to said electromagnet, a second current control means for controlling the magnitude of current supplied to said electromagnet, means for connecting said first or second current control means selectively in said circuit, said selectively connecting means comprising a single-pole double-throw snap action switch adapted to be actuated by the end of said scale beam as it passes from an unbalance position to a position near balance, and a mercury switch in said circuit and operative to open said circuit when said balance beam reaches balanced position, and a master current control means in said circuit for controlling the strength of current through said electromagnet during the entire weighing operation.

5. An automatic material feeding and container filling apparatus comprising a scale having a movable balance beam for weighing materials, a material hopper, a resiliently mounted material flow tray adapted to receive material from said hopper and convey it to said scale, means including an electromagnet for vibrating said tray and thereby convey the material to said scale, an electrical circuit for supplying pulsating energizing current to said magnet, a first current control means for controlling the magnitude of current supplied to said electromagnet, a second current control means for controlling the magnitude of current supplied to said electromagnet, means for connecting said first or second current control means selectively in said circuit, said selectively connecting means comprising a single-pole double-throw snap action switch adapted to be actuated by the end of said scale beam as it passes from an unbalance position to a position near balance, and a mercury switch in said circuit and operative to open said circuit when said balance beam reaches balanced position, and a foot-operable switch in said circuit for open-circuiting said circuit during intervals between subsequent weighing operations.

6. The invention as defined in claim 1 including a sleeve member communicating with the outer end of said tray and adapted to convey material dropping from said tray into containers to be filled on said weighing scale.

References Cited in the file of this patent

UNITED STATES PATENTS

| | | |
|---|---|---|
| 2,071,443 | Weckerly | Feb. 23, 1937 |
| 2,116,934 | Rapp | May 10, 1938 |
| 2,258,182 | Howard | Oct. 7, 1941 |
| 2,262,620 | Neuman | Nov. 11, 1941 |
| 2,303,140 | Sackett | Nov. 24, 1942 |
| 2,626,042 | Aldridge | Jan. 20, 1953 |